Sept. 12, 1950 B. A. SCHWARZ 2,521,752

RADIO STATION SELECTOR

Filed Jan. 19, 1948 3 Sheets-Sheet 1

Inventor

Bertram A. Schwarz

By

Spencer, Willits, Helwig & Baillio

Attorneys

Inventor
Bertram A. Schwarz
By
Spencer, Willits, Helwig & Baillio
Attorneys

Sept. 12, 1950 B. A. SCHWARZ 2,521,752

RADIO STATION SELECTOR

Filed Jan. 19, 1948 3 Sheets-Sheet 3

Inventor

Bertram A. Schwarz

By

Spencer, Willits, Helwig & Baillio

Attorneys

Patented Sept. 12, 1950 2,521,752

UNITED STATES PATENT OFFICE 2,521,752

RADIO STATION SELECTOR

Bertram A. Schwarz, Kokomo, Ind., assignor to General Motors Corporation, Detroit, Mich., a corporation of Delaware Application January 19, 1948, Serial No. 3,050

15 Claims. (Cl. 250—20)

The present invention relates to radio receivers capable of receiving a signal modulated at both audio (voice or music) frequencies and a sub-audio code frequency. More particularly it relates to a radio for selectively receiving a radio signal having any selected one of a number of sub-audio code frequency modulations.

A radio receiver operator may desire the reception of a chain station program when he does not know the frequency of the local station carrying the program. This frequently happens with automobile radios while traveling in an area where the operator is unfamiliar with the local stations.

There are three methods of tuning in general use at the present time. One of these, straight manual tuning, does not have any selectivity except that introduced by the operator himself. A second method of tuning using a so-called push button, either sequential or selective, has certain preselected frequencies set up on the mechanism for specific stations. A third method of tuning, that of signal seeking selective tuning includes a means for automatically tuning in any station having a predetermined signal strength. None of the various methods of tuning solve the problem encountered by the radio operator desiring to tune to any station of a predetermined system of stations.

In the practice of the present invention it is provided that each station of a chain carry a sub-audio code signal modulated on the carrier. The modulation of this code signal may be either amplitude modulated or frequency modulated. For the purposes of illustration the figures in the present patent application and the specification thereof will be particularly concerned with amplitude modulated signals having a sub-audio code signal amplitude modulated thereon.

It is therefore an object of the present invention to produce a radio receiver having an automatic tuning means selective to receive only signals having a specific code frequency modulated thereon.

It is a further object of the present invention to produce an automatic tuning means for a radio receiver, capable of sequentially tuning the receiver to all signals, within the frequency spectrum, of such amplitude as will give satisfactory reception.

It is a further object of the present invention to produce an automatic means capable of tuning a radio receiver selectively to any station having a preselected code frequency modulated on its carrier and having a signal strength of sufficient intensity to give satisfactory reception.

It is a further object of the present invention to produce a squelch circuit capable of making the audio amplifier section of a radio receiver insensitive to all signals except those carried by a carrier frequency having modulated thereon a code frequency of preselected sub-audio frequency and one in which the signal is of sufficient intensity to give satisfactory reception.

It is a further object of the present invention to produce a filter system for selecting the code frequency.

It is a further object of the present invention to produce a receiver which will differentiate between the different chain radio systems and tune in only that station carrying a preselected chain system program and having suitable signal intensity for satisfactory reception.

It is a further object of the present invention to produce a receiver with means for squelching all signals except those having sufficient intensity to give satisfactory reception.

Other objects of this invention will become apparent upon reading the specification and inspection of the drawings and will be particularly pointed out in the claims.

Referring to the figures.

Figure 1:
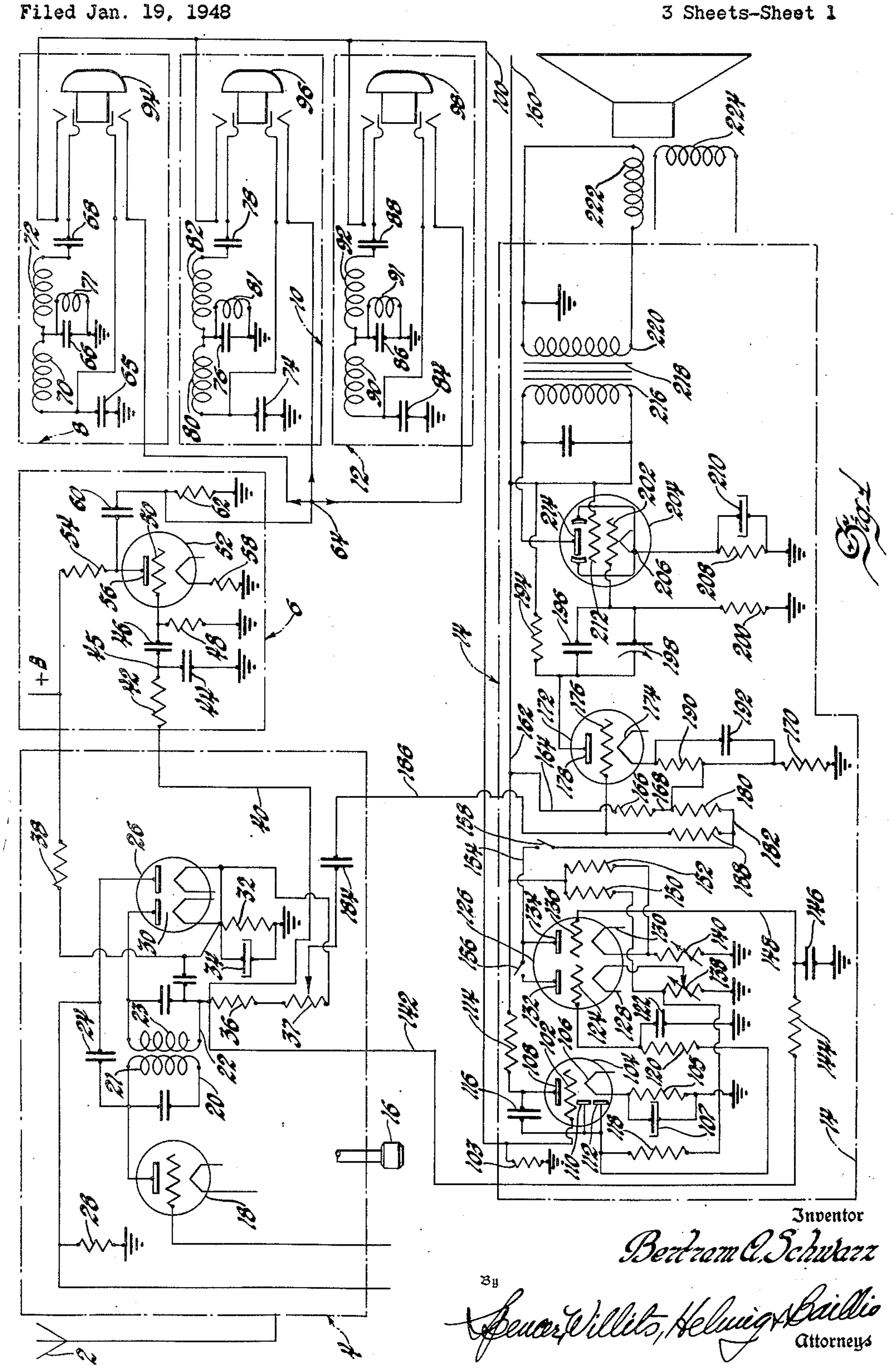
Figure 1 is a manually tuned radio receiver with a squelching circuit.

Referring more particularly to the figures, Figure 1 shows a manually tuned radio receiver having means for squelching all signals except those carrying a preselected sub-audio code modulation. In this figure, 2 is an antenna of conventional design and 4 is a radio signal receiver including the R. F. amplifier, I. F. amplifier and detector circuits. The circuits of the R. F. amplifier, oscillator, and most of the I. F. amplifier, are not shown since these circuits are of conventional design. 6 is an amplifier capable of filtering out the audio frequencies and amplifying the sub-audio code frequencies. 8, 10 and 12 are selective band pass filters, each capable of passing only the sub-audio code frequency selected. 14 contains an amplifier detector, squelch circuit and audio frequency amplifier. 16 is a manual tuning device which may be a knob of other conventional means of manually adjusting the resonant circuits of the receiver.

Referring to the amplifier and detector included in 4, 18 is the amplifier tube in the last stage of the intermediate frequency amplifier. The circuit preceding this tube is of conventional design and therefore not illustrated. The plate circuit of this tube includes the fixed frequency tuned primary circuit 20. The coil 21 in this circuit is inductively coupled to the coil 23 of the resonant secondary circuit 22. The circuits 20 and 22 form a double tuned circuit for the last intermediate frequency stage. The circuit 20 is coupled to the rectifier tube 26 by means of condenser 24. This circuit which is of conventional design is used to produce a D. C. automatic volume control voltage across the resistor 28. The secondary tuned circuit 22 is coupled to the audio frequency detector 30. This circuit in common with the AVC circuit contains a biasing resistor 32 and by-pass condenser 34. By means of this circuit and resistances 36 and 37 audio and sub-audio frequencies are produced across these latter two resistances. Audio and sub-audio frequencies of high intensity are transmitted by conductor 40 to the amplifier 6.

This amplifier contains a filter including resistor 42 and condenser 44 for by-passing and removing all audio frequencies. The sub-audio frequencies appearing at the point 45 are transmitted to the grid 50 of the tube 52 by a coupling circuit including condenser 46 and resistor 48. The value of the power factor of the circuit including resistor 42 and condenser 44 is such that all frequencies below the audio range including the sub-audio code frequencies are impressed upon the grid of the tube 52. 54 is a plate load resistor for tube 52. The negative grid bias for this tube is obtained through a circuit including biasing resistor 58. The sub-audio code frequencies produced at the plate of this tube are coupled to the band pass filters by condenser 60 and resistor 62. The sub-audio code signal present at the points 64 is simultaneously impressed upon the filter systems 8, 10 and 12.

Each of these filter systems is a sharp cut-off band pass filter responsive to a preselected sub-audio signal. For example, the filter system 8 will utilize such values of condensers 65, 66 and 68 and inductances 70, 71 and 72 to pass a preselected sub-audio signal of, for example, 5 cycles per second. The filter system 10 will have such value of condensers 74, 76 and 78 and inductances 80, 81 and 82 so as to pass a frequency of, for example, 10 cycles per second. The filter system 12 will have such value of condensers 84, 86 and 88 and inductances 90, 91 and 92 so as to pass a frequency of, for example, 20 cycles per second. The selection and arrangement of the condensers and inductances in each of these filter systems will depend on the sub-audio frequencies used by the particular chain program it is desired to have the radio set respond to. For example, all National Broadcasting Company affiliates handling its chain program would use a code of 5 cycles per second. All American Broadcasting Company affiliates would use, say, 10 cycles per second and all Mutual Broadcasting affiliates use, say, 20 cycles per second. Each of the affiliate stations of the chain broadcasting system would modulate with the sub-audio frequency code assigned that chain radio system only when carrying the chain radio program. The operator would select the chain system program which he desired by connecting the corresponding filter system into the circuit. Each of the systems has a push button with contacts thereon capable of connecting that filter system into the circuit. The push buttons 94, 96, and 98 connect the filters 8, 10, and 12 respectively into the circuit.

The selected sub-audio frequency proceeds through the conductor 100 to the grid 102 of the tube 104. 103 is the ground return resistor for the grid 102. When the radio receiver is tuned to any frequency other than that frequency having the selected coded sub-audio frequency thereon, the line or conductor 100 carries no signal, and the tube 104 is in a passive state. The tube 104 has a cathode 106 which is self-biased by a resistor 105 and condenser 107, a triode plate 108 and two interconnected diode plates 110 and 112. When a sub-audio signal is impressed on the grid 102 the triode amplifies this signal across plate load resistor 114 and the signal is fed through coupling condenser 116 and is impressed across the diode by means of resistor 118. The output of this diode rectifier system is a combined negative D. C. and negative rectified pulses of the selected sub-audio frequency. The A. C. components of this signal are removed by the low pass filter circuit including resistance 120 and condenser 122. The power factor of this filter circuit is so selected that it will effectively attenuate all sub-audio frequencies which may be used as code or control frequencies. The remaining negative D. C. component is impressed upon the grid 124 of the tube 126. This tube in addition has cathodes 128 and 130, plates 132 and 134 and a second grid 136. When the grid 124 has sufficient negative potential impressed thereon to bias that half of the double triode to below cutoff no current will flow between the plate 132 and the cathode 128.

Each half of this double triode has an adjustable grid bias resistor in the cathode circuit. These are resistors 138 and 140. The adjustment of these resistors determine the amount of negative potential across 36, 37 and 118 respectively necessary to bias their respective triode to below cutoff. Since this tube handles only D. C. potentials it is not necessary to have an A. C. bypassing condenser across the biasing resistors. A second squelch removing signal conductor 142 is connected across the resistors 36 and 37 to the same point as conductor 40. The signal at this point is a combined audio and sub-audio signal superimposed on a D. C. potential. The sub-audio and audio frequencies are removed by the low pass filter circuit including resistor 144 and condenser 146. The power factor of this circuit, the same as mentioned in connection with the power factor of the circuit 120, 122 must be such as to attenuate all sub-audio frequencies which may be used as code or control frequencies. The unattenuated negative D. C. potential is then impressed upon the grid 136 through the conductor 148. When this negative D. C. potential is sufficient to bias the triode to below cutoff no current will flow between the plate 134 and the cathode 130. Here, as mentioned before, the adjustment of the self-biased resistor 140 will determine the potential at which the tube is biased below cutoff and therefore non-conducting. The biasing potential for the bias resistors 138 and 140 is obtained through potential dropping resistor 150 and 152 from the plate supply potential or B plus source 160 of the radio set. It may thus be seen that when both grids 124 and 136 are biased below cutoff no current will flow through the conductor 154. However, if either of these grids are of such potential as to allow tube conduction, current will flow in the conductor 154. Therefore, to prevent flow of current in this conductor 154, the signal received must contain the sub-audio frequency selected by one of the push buttons 94, 96, or 98.

It may at times be desirable to receive local stations not carrying one of the chain system programs. In this case it would be very desirable to make the selector system ineffective. To do this a switch 156 has been placed in the plate circuit 132. This makes the radio system squelch removing signal only dependent upon the presence of an audio frequency and D. C. in the conductor 142. An alternate location for the switch 156 is switch 158. On opening switch 158 both squelch removing signal circuits will be rendered inoperative as will be appreciated as this specification progresses. Assuming switches 156 and 158 to be closed and no audio or sub-audio frequency present, a current from the source 160 flows through conductors 162 and 164 and resistor 166. Current at the point 168 may divide part of this current flowing through the resistor 170 to give a plus bias on the cathode 174. This positive bias is added to the audio signal so that it lifts the entire operating potential of the tube 172 but does not affect the relative potentials between the cathode 174 and grid 176 of this tube. The current at the point 168 may proceed through squelching resistor 180 as current flows through the conductor 154 when either half of the double triode 126 is conducting. When current flows through this resistor, the point 182 is biased to a potential negative relative to the point 168. This in effect places a negative potential on the grid 176 and thus biases this grid to below its cutoff point so that no signal will be amplified by the tube. The audio frequency which tube 172 amplifies is obtained from a tap on the volume control resistor 37 and is coupled through condenser 184 to conductor 186. This signal is impressed across resistors 188, 180 and 170. If the grids 124 and 136 are biased beyond cutoff so that no current flows in conductor 154 or if this same result is obtained by the opening of switches 156 or 158 the grid 176 of the tube 172 is biased by resistor 190 and condenser 192 so that it is at the proper operating potential of this tube. Under this set of conditions tube 172 acts as an amplifier and an audio frequency is impressed across load resistor 194 and through coupling condensers 196 and 198 across grid resistor 200 to the grid 202 of the beam power tube 204. The tube 204 has a cathode 206 which is self-biased by resistor 208 and condenser 210. The grid 212 of this tube and the plate 214 both have the full plate potential obtained from source 160 impressed thereon. The coupling condenser 198 in one particular modification of the present invention is made adjustable for tone control purposes. The varying of condenser 198 changes the time constant of the circuit including condenser 196 and resistor 200 so as to attenuate the low audio frequencies an amount dependent upon the adjustment of this condenser 198. The audio frequency signal impressed upon the control grid 202 is amplified by the tube 204 and impressed across the primary 216 of the audio frequency output transformer 218. The output from the secondary 220 of this transformer is impressed across the voice coil 222 of the loud speaker. This speaker may be of either the permanent magnet type, or electromagnet type as it forms no part of the present invention. If it is of the electromagnet type, magnetic coil 224 is required for energization.

*Operation of circuit in Figure 1*

Assuming the operator of the radio receiver desired to receive the National Broadcasting System program, he will press the selective button 94 which couples the band pass filter for the National Broadcasting System sub-audio frequency into the circuit. The operator then turns the manual tuner 16 scanning the broadcast band. As various radio frequency signals are received they are rectified and filtered and the remaining D. C. component is fed through conductor 148 to energize the grid 136 causing the current between plate 134 and cathode 130 to be interrupted. This, however, does not interrupt the current through the conductor 154 so as to remove the squelch signal from the grid 176 since current is allowed to flow between the plate 132 and the cathode 128 of the tube 126. The operator continues the operation of the tuner knob 16 until a signal is reached containing the sub-audio frequency which the band pass filter 8 will pass. When this happens, a signal is conducted through conductor 100 to the grid 102 of the tube 104 where it is amplified and fed to the plates 110 and 112 of the diode portion of this tube. The detected output is then fed through a filter and the remaining negative D. C. potential impressed on the grid 124 to interrupt the current flow between the plate 132 and the cathode 128. At the same time a second current is conducted through conductor 142 and filtered so that its remaining negative D. C. potential is impressed upon the grid 136 interrupting the flow of current between the plate 134 and the cathode 130, thus current flow in the conductor 154 is interrupted so that the D. C. bias between the points 182 and 168 is zero. In this condition the bias potential on the grid 176 is such as to place this grid at its operating potential and permits amplification of audio frequency potentials. The audio frequency signal is conducted through conductor 186 amplified by tubes 172 and 204 and ultimately impressed across the voice coil 222 of the loud speaker thus energizing the speaker. It may thus be seen that when the switches 158 and 156 are closed, the set is insensitive to any signal not containing the sub-audio frequency selected by the selector buttons 94, 96 and 98. If the operator desires to operate this set as an ordinary radio not selective to any particular program he may open the switch 156 or the switch 158. If he opens the switch 156 the signal received must be of sufficient amplitude for satisfactory listening or the grid 136 will not be biased beyond cutoff and a squelch signal will remain on the grid 176 so as to make this tube inoperative. This also produces a noise squelching action between stations. If the operator desires to receive all signals regardless of audio frequency amplitude he may open the switch 158. This switch completely de-energizes the squelch system and the radio may be operated as an ordinary manually tuned or push button tuned set.

Figure 2:
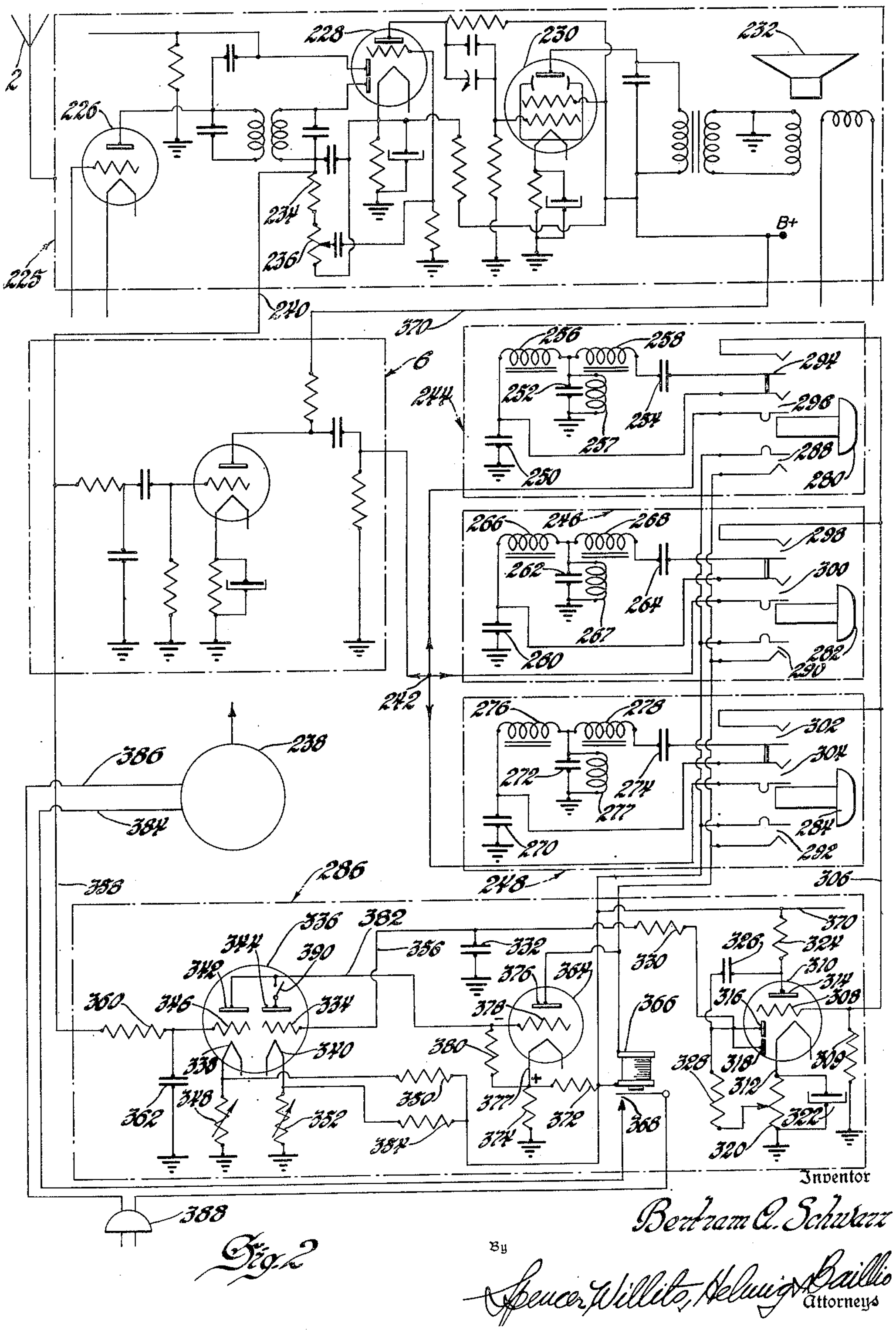
Figure 2 is a motor tuned radio receiver.

Figure 2 of the drawing shows a modification of the present invention which includes means for automatically tuning a radio receiver to a desired station or class of stations. This modification of the present invention may be incorporated in a standard model FM or AM receiver so as to tune the set to a station having a predetermined sub-audio modulation. This modification may also be used to automatically tune the set to any station whose signal at the receiver is of sufficient amplitude to give satisfactory reception.

Referring to Figure 2, 2 is a conventional antenna which is coupled to a radio receiver 225 by a conventional coupling system. 225 may be a typical receiver capable of receiving either amplitude modulated or frequency modulated signals. The circuit shown is particularly adapted to receive amplitude modulated signals. In this receiver 226 is the last intermediate frequency amplifier tube, 228 is a duo-diode-triode detector amplifier, 230 is a beam power audio frequency amplifier tube, 232 is a loud speaker. All of these elements are of conventional design and the coupling circuit between them is of conventional design and of the same general type as more specifically described in connection with Figure 1. Resistors 234 and 236 correspond respectively to resistors 36 and 37 in Figure 1. Figure 1 has a manual means for tuning the receiver while in the present modification this same mechanical means is driven by an electric motor instead of manually. Motor drives are old in the art and therefore the applicant has not considered it necessary to indicate specifically the exact connection between the tuning motor 238 and the mechanical linkage used to drive the variable condenser or inductance for varying the resonant frequency of circuits in the radio frequency and local oscillator portion of the receiver. The output across the resistors 234 and 236 is, as more specifically described in Figure 1, coupled to the amplifier 6 by means of conductor 240. This amplifier 6 is identical to the amplifier 6 described in connection with Figure 1 and therefore will not be more fully described at the present time. The sub-audio signal from the amplifier 6 is impressed at the point 242. 244, 246 and 248 contain band pass filters, each of which is responsive to a preselected sub-audio code frequency. For example, the proportioning of condensers 250, 252, 254 and inductances 256, 257 and 258 may be such as to pass a frequency of 5 cycles per second. The proportioning of condensers 260, 262, 264 and inductances 266, 267 and 268 may be such as to pass a sub-audio frequency of 10 cycles per second. The proportions of condensers 270, 272, 274 and inductances 276, 277 and 278 may be such as to pass a sub-audio frequency of 20 cycles per second. With these assumed values, 244 will pass 5 cycles per second, 246 will pass 10 cycles per second and 248 will pass 20 cycles per second. Selective buttons 280, 282 and 284 are included for the purpose of connecting the desired sub-audio filter into the circuit to the tuning motor control 286. These selective buttons have a second purpose, in addition to connecting a filter into the circuit and, that is, to close the switches 288, 290 or 292 respectively, momentarily on the depression of the selected button. The switches connecting the band pass filter into the circuit remain closed after the button is pushed. For example, when selective button 280 is depressed, switches 294 and 296 are closed permanently while contacts 288 are momentarily closed and then reopened. When selective button 282 is actuated, contacts 298 and 300 are permanently closed while contact 290 is momentarily closed and then reopened. When button 284 is depressed, contacts 302 and 304 are permanently closed while contact 292 is only momentarily closed and then reopened. The depressing of button 280, 282 or 284 connects the selective band pass filter into the circuit and the sub-audio frequency thus passed is transferred by means of conductor 306 to the grid 308 of the triode section of the duo diode triode 310. Tube 310 has cathode 312, a triode plate 314 and diode plates 316 and 318. The cathode 312 is biased by means of a self-biasing circuit including resistor 320 and condenser 322. 309 is a ground return resistor for grid 308. The sub-audio frequency placed upon the grid 308 is amplified by the triode and impressed across load resistance 324. This signal is coupled to the diode plates 316 and 318 by means of coupling condenser 326 and resistor 328. The output of this duo diode is a combined negative unidirectional sub-audio and D. C. potential. The A. C. components of this signal are removed by low pass filter including resistor 330 and condenser 332. The remaining D. C. potential is impressed upon the grid 334 of the double triode 336. This double triode 336 has cathodes 338 and 340 and plates 342 and 344 as well as a second control grid 346. The cathodes 338 and 340 are maintained at the desired bias potential by means of adjustable biasing resistance 348 plus potential dropping resistor 350 and adjustable biasing resistor 352 plus potential dropping resistor 354 respectively. Since these cathodes 338 and 340 receive their bias from a source having no A. C. components it is not necessary to by-pass 348 or 352 with a condenser. Due to the circuit arrangement of the diode rectifier any signal impressed upon the grid 334 through conductor 356 is negative. By properly proportioning the biasing resistor 352 and potential dropping resistor 354 the potentials within this tube may be so adjusted that current may be allowed to pass from plate 344 to cathode 340 when no D. C. potential is impressed upon the grid 334 but the tube will not conduct when a negative potential is impressed upon this grid. Referring now to the receiver 225, a second conductor 358 is adjustably connected to the same position on the resistor 234 as is conductor 240. The combined audio, sub-audio and D. C. potential produced across resistors 234 and 236 by means of the detector action of the diode portion of duo-diode-triode 228 is impressed upon the conductor 358. All alternating frequency components present in the signal in conductor 358 are removed by the low pass filter which includes resistor 360 and condenser 362. Therefore, any radio frequency signal received by the receiver results in a D. C. negative potential being impressed on the grid 346. The resistors 348 and 350 are so adjusted and proportioned that current will be conducted by the plate 342 and the cathode 338 when no negative potential is impressed upon the grid 346. The impressing of a negative potential on the grid 346 will, however, bias this tube to beyond cutoff and therefore prevent the flow of current from its plate to its cathode. The triode 364 may be termed a relay control triode since it controls the flow of current through the relay coil 366 and hence opens and closes the contacts 368 of the relay. Upon inspection of the circuit it may readily be seen current from the B plus power supply 370 may flow through resistors 372 and 374 to give the cathode 377 of the triode 364 the proper bias. The plate potential for this tube is obtained through the relay coil 366. The plate 376 of this tube, of course, draws no current when the grid 378 is negatively biased beyond cutoff. The negative bias for the grid 378 is obtained across resistor 380. If current is allowed to flow through the conductor 382 because either section of the double triode 336 is conducting, a voltage drop across the resistor 380 will cause the grid 378 of the tube 364 to be biased beyond cutoff. In this condition no current will flow through the relay coil 366 and the contacts 368 of the relay will be in the closed position thus energizing the tuning motor 238 through conductors 384 and 386 from power source 388. This power source may be of any desirable source capable of actuating the tuning motor. This tuning motor when energized causes the tuning means to sweep through the radio frequency band. The tuning means will continue its sweep through the frequency band until a signal is received. The signal components when rectified will produce a negative bias on the grid 346 and thus prevent that half of the tube from conducting. If it is desired to use the present invention to receive any and all radio stations, a switch 390 is provided to permit the control of the system by the energization of only the grid 346. If, however, the system is used to selectively receive a desired chain radio program the switch 390 is closed so that the biasing of the grid 346 does not prevent the flow of current through the conductor 382. When the tuning means sweeps across the radio frequency so that a signal is received having a preselected sub-audio code modulated thereon a current is caused to flow through the conductor 306 and by means of the circuit previously described. This impresses a negative potential on the grid 334. Under these conditions both halves of the double triode are biased beyond cutoff so that no current is allowed to flow through the conductor 382. Under these conditions no current flows through the resistor 380 and hence the grid 378 returns to the same potential as the cathode 377. The removal of this negative bias permits the tube 364 to conduct thus permitting a current to flow from the power source 370 through the relay coil 366 through the plate 376 through the cathode 377 through the resistor 374 to ground. This energizes the relay, thus opening the contacts 368 and stopping the tuning motor 238 on the frequency of the carrier containing the selected sub-audio modulation. If it is desired to receive a station carrying a different chain program or to a different station carrying the same chain program, the program selector button either 280, 282 or 284, as desired, is depressed. This momentarily closes either contacts 288, 290 or 292 respectively, thus shorting the relay coil 366 deenergizing the relay and thus allowing the contacts 368 to close which reenergizes the tuning motor 238 to retune the set.

*Operation of Figure 2*

If the operator of the radio receiver desires to obtain a program being broadcast by, say, the National Broadcasting Company and this program has a sub-audio modulation of say, 5 cycles per second, the operator presses the button 280. This closes the contacts 288 deenergizing the relay coil 366 allowing the contacts 368 to close thus starting the tuning motor 238. Immediately thereafter the contacts 288 reopen giving control of the tuning motor to the tube 364. The tuning motor continues to scan the spectrum until a carrier having a modulation frequency of 5 cycles per second is reached. The filter system 244 by passing this 5 cycle signal causes the current to flow in the conductor 306 and impress a signal on the grid of the tube 310. This signal is amplified and causes a negative bias to be impressed upon the tube 334. Simultaneously this 5 cycle modulation frequency plus other modulation frequencies on the received signal causes the negative grid bias to be impressed on the grid 346. The presence of this bias on both grids 346 and 334 causes the stopping of current through the resistor 380 thus removing the negative bias from the grid 378. This removal of grid bias allows the tube 364 to conduct thus energizing the coil 366 to open the relay contacts and stop the motor 238 on the received carrier frequency.

If the operator desires to receive any radio signal having sufficient intensity to give satisfactory reception, he opens the contact 390 thus disabling the sub-audio frequency control part of the circuit. The circuit is then entirely responsive to the conduction or non-conduction of current through the plate 342. The operator then presses any one of the station selector buttons 280, 282 or 284 to momentarily shunt the relay coil 366 thus allowing the contacts 368 to close energizing the tuning motor 238. As previously described, the contact 288, 290 or 292 immediately reopens giving control of the tuning means to the conductor 358. The tuning motor causes the tuning means to scan the frequency spectrum until a signal is received. The D. C. potential produced by rectification is then impressed on the conductor 358 and produces a negative grid bias on the grid 346. This bias is produced regardless of whether the received signal contains any sub-audio code frequency or not. The presence of this negative grid bias stops the conduction of the tube and hence the current through the conductor 382 and the resistor 380. This removes the grid bias from the tube 364 thus allowing this tube to conduct, producing a current through the relay coil 366. This opens the contacts 368 thus deenergizing the tuning motor and stopping the tuning means on the frequency producing the grid bias on the grid 346. If the operator desires to tune the set to a second station he merely pushes either one of the selector buttons and the operation is repeated.

It is well known that at very low frequencies vibrating reeds may be utilized to produce a band pass filter which may be cheaper and more efficient than the filters using inductances and condensers, as for example those described in connection with Figures 1 and 2.

Figure 3:
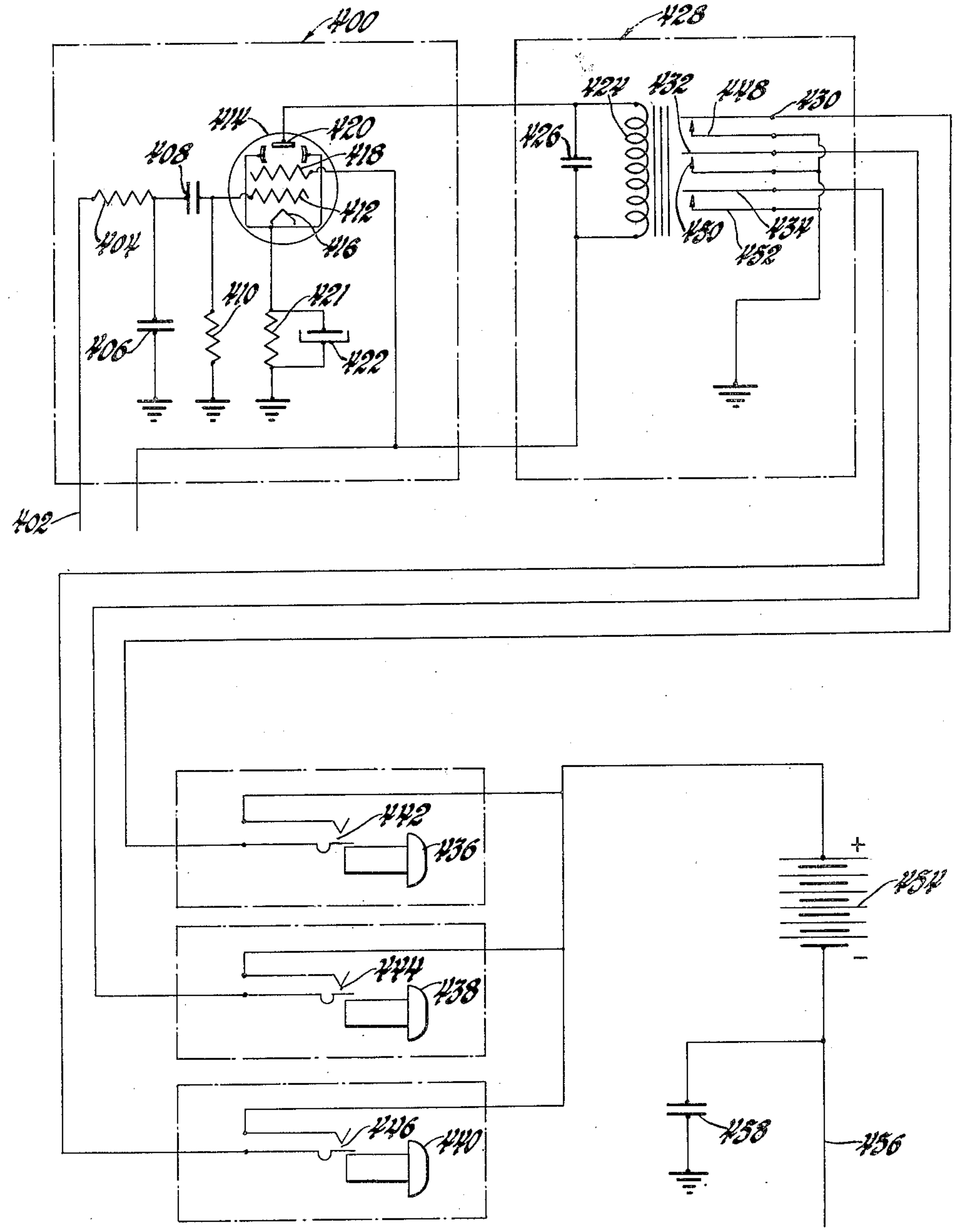
Figure 3 is a mechanical vibrator filter system.

Therefore, referring to Figure 3, the amplifier 400 is shown. This amplifier receives the audio and sub-audio frequency components from the receiver through conductor 402. The conductor 402 corresponds to conductor 40 in Figure 1 and 240 in Figure 2. A low pass filter having resistor 404 and condenser 406 remove all audio frequency components. The coupling condenser 408 and resistor 410 remove the D. C. components and impress the sub-audio frequencies on the grid 412 of the beam power tube 414. This tube has a cathode 416, a second grid 418 and a plate 420. The self-bias for the cathode 416 is produced by the biasing circuit including resistor 421 and condenser 422. The sub-audio frequency output of this tube is impressed across the coil 424 and condenser 426 of the selector system 428. This mechanical selector system has reeds 430, 432 and 434 each having a mechanical resonant period at a desired sub-audio frequency. The reed 430, for example, may have a resonant period of 5 cycles per second, the reed 432 have a resonant period of 10 cycles per second and the reed 434 have a resonant period of 20 cycles per second. These reeds are magnetically coupled to the coil 424 and are capable of vibrating at their own resonant frequency when energized by a signal of that frequency. Selector buttons 436, 438 and 440 are connected respectively to the vibrating reeds 430, 432 and 434. When one of these selector buttons is depressed it closes contact 442, 444 or 446. This completes the circuit through contact 448, 450 or 452. If the operator, for example, desires to receive a station having a sub-audio modulation frequency of 5 cycles per second he will depress the button 436 thus closing contact 442. The tuning means then scans through the spectrum until a signal having a 5 cycle sub-audio modulation is received. When this 5 cycle sub-audio signal is impressed on the coil 424 the mechanical resonance period of the contact 430 causes this reed to vibrate in synchronism with the electrical signal in the coil 424. This periodically completes the circuit from the power source 454 through the contacts 442 through contact 448 to ground. This 5 cycle signal is carried through conductor 456 to the grid 102 in the squelch removing circuit as shown in Figure 1 or to the grid 308 in the tuning motor control circuit as shown in Figure 2. The condenser 458 is of such capacity as to effectively bypass high frequency components caused by the vibrating contact 448 but not the sub-audio control signal frequencies of 20 cycles or less. If the operator desires to receive signals having a sub-audio modulation of 10 cycles per second he depresses button 438. If he desires to receive signals having a sub-audio modulation of 20 cycles per second he depresses button 440.

It may thus be seen that the filter system shown in Figure 3 may be substituted for the filter system utilized in the circuits shown in Figure 1 and Figure 2.

It is to be understood that although the invention has been described with specific reference to a particular embodiment thereof, it is not to be so limited. The present system, for example, could be adapted to operate on a coded predetermined number of pulses of sub-audio frequency and thus tune the radio to the desired frequency without departing from the broad scope of the present invention. In such a system the station carrying the chain program would emit a predetermined number of sub-audio pulses modulated on the carrier. These pulses would actuate counters instead of filters in the receiver and the output of these counters would supply the stopping or squelch removing voltage.

It is therefore intended that the scope of the appended claims be construed as broadly as their language and the status of the prior art permits.

I claim:

1. A radio receiver capable of receiving a radio frequency carrier signal modulated by a sub-audio frequency voltage and an audio frequency voltage; including a tuned amplifier capable of amplifying the carrier frequency, together with side bands, a detector capable of detecting both the audio and sub-audio frequency voltages from the output signal of said amplifier, a filter for separating said audio and sub-audio frequency voltages, means for adjusting the tuning element of said tuned amplifier and means responsive to both the carrier frequency signal and said sub-audio frequency voltage for causing said adjusting means to be ineffective.

2. A radio receiver as claimed in claim 1, in which the filter for separating the sub-audible frequency voltage consists of mechanically vibrating reeds carrying electrical contacts.

3. A radio receiver as claimed in claim 1 in which the means for adjusting the tuning element is an electrical motor.

4. A radio receiver as claimed in claim 1 in which the means responsive to both the carrier frequency signal and the sub-audio frequency voltage includes a thermionic valve which is rendered conductive by presence of both the carrier and the sub-audio frequency signals.

5. In a radio receiver capable of receiving a radio frequency carrier signal modulated with a fixed sub-audio frequency voltage and an audio frequency voltage, means for detecting said audio and sub-audio frequency voltages, a vacuum tube amplifier for amplifying said audio frequency voltage, a grid in at least one tube of said amplifier normally negatively biased to make said amplifier inoperative, means responsive to the combined effect of said carrier frequency signal and said sub-audio frequency voltage to remove said bias and permit said audio frequency amplifier to amplify said audio frequency voltage.

6. A radio receiver capable of receiving a radio frequency carrier signal modulated with an audio and a sub-audio frequency voltage including, an electric motor for tuning said radio through a range of said radio frequencies, a detector capable of detecting the sub-audio frequency voltage from said radio frequency carrier, an electronic amplifier capable of amplifying said sub-audio frequency, a thermionic tube having a relay coil in the plate thereof, relay contacts responsive to the current in said coil for deenergizing said tuning motor and means responsive to said detected sub-audio frequency for removing control grid bias from said thermioinic tube to allow said tube to conduct electricity and thus operate said relay.

7. A radio receiver as claimed in claim 6 in which the means responsive to the sub-audio frequency voltage includes a rectifier and a thermionic tube the control grid of which is biased beyond cutoff by the presence of said rectified sub-audio frequency voltage and which allows plate current conduction when said voltage is not present on said control grid.

8. A radio receiver capable of receiving a radio frequency carrier signal modulated by both audio and sub-audio frequency voltages including; an electric motor for tuning the radio through a band of radio frequencies, a detector for detecting said audio and sub-audio frequency voltages from said radio carrier frequency, means for rectifying said radio frequency carrier signal, an amplifier capable of amplifying said sub-audio frequency voltages, a plurality of filters each capable of passing a predetermined sub-audio frequency, means for introducing a selected filter into the plate circuit of said sub-audio frequency amplifier, means for rectifying the selected sub-audio frequency, a thermionic tube, means responsive to the plate current thereof for deenergizing said tuning motor, means responsive to the combined effect of the rectified audio and the selected sub-audio signals and for removing the grid bias of said tube to allow conduction of said plate current to deenergize said tuning motor.

9. A radio receiver as claimed in claim 8 in which the means responsive to the rectified signal consists of two thermionic tubes having a common plate circuit, one of said thermionic tubes being biased beyond cutoff responsive to the rectified sub-audio frequency and one of said tubes biased beyond cutoff by the rectified carrier frequency signal in such a manner that current ceases to flow in the common plate circuit only when a received radio frequency signal contains sub-audio components so as to bias both said control grids beyond cutoff.

10. A radio receiver capable of receiving a radio frequency carrier modulated with an audio frequency including; an electric motor for tuning said radio through a range of radio frequencies, a rectifier capable of rectifying said radio frequency carrier signal, a thermionic tube having a relay coil in the plate circuit thereof, relay contacts responsive to the current in said coil to deenergize said tuning motor, and a second thermionic tube the control grid of which is biased beyond cutoff by the presence of said rectified signal and which allows plate current conduction when no signal is present on said control grid, the removal of said last mentioned plate current by said signal causing the removal of the control grid bias on said first mentioned thermionic tube to thereby allow said tube to conduct electricity and thus operate said relay.

11. A radio receiver as claimed in claim 1 in which the filter for separating the sub-audio frequency voltage includes mechanically vibrating reeds carrying electrical contacts and in which the means for adjusting the tuning element is an electrical motor.

12. A radio receiver as claimed in claim 1 in which the means responsive to both the carrier frequency signal and the sub-audio frequency voltage includes a thermionic valve which is rendered conductive by the presence of both the carrier frequency signal and the sub-audio frequency voltage in which the means for adjusting the tuning element is an electrical motor.

13. A radio receiver as claimed in claim 1 in which the filter for separating the sub-audio frequency voltage includes mechanically vibrating reeds carrying electrical contacts and in which the means responsive to both the carrier frequency signal and the sub-audio frequency voltage includes a thermionic valve which is rendered conductive by the presence of both the carrier frequency signal and the sub-audio frequency voltage.

14. A radio receiver as claimed in claim 1 in which the filter for separating the sub-audio frequency voltage includes mechanically vibrating reeds carrying electrical contacts and the means for adjusting the tuning element is an electrical motor, and the means responsive to both the carrier frequency signal and the sub-audio frequency voltage includes a thermionic valve which is rendered conductive by the presence of both the carrier frequency signal and the sub-audio frequency voltage.

15. A radio receiver capable of receiving a radio frequency carrier signal modulated with an audio and a sub-audio frequency voltage including, an electric motor for tuning said radio through a range of said radio frequencies, a detector capable of detecting the sub-audio frequency voltage from said radio frequency carrier, an electronic amplifier capable of amplifying said sub-audio frequency, a thermionic tube having a relay coil in the plate thereof, relay contacts responsive to the current in said coil for deenergizing said tuning motor and means responsive to both said detected sub-audio frequency and said radio frequency for removing control grid bias from said thermionic tube to allow said tube to conduct electricity and thus operate said relay.

BERTRAM A. SCHWARZ.

REFERENCES CITED

The following references are of record in the file of this patent:

UNITED STATES PATENTS

| Number | Name | Date |
|---|---|---|
| Re. 21,151 | Adair | July 18, 1939 |
| 2,105,789 | Linsell | Jan. 18, 1938 |
| 2,144,822 | Van Loon | Jan. 24, 1939 |
| 2,197,933 | Kirkwood et al. | Apr. 23, 1940 |
| 2,262,218 | Andrews | Nov. 11, 1941 |
| 2,410,075 | Hutchins et al. | Oct. 29, 1946 |